Jan. 3, 1967 W. J. BLEACKLEY 3,296,558
POLARIZATION CONVERTER COMPRISING METAL RODS MOUNTED ON
A TORSION WIRE THAT TWISTS WHEN ROTATED
Filed Sept. 22, 1965
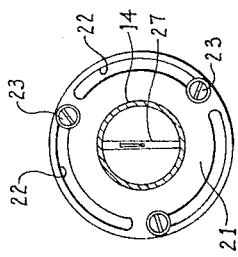
Fig. 2
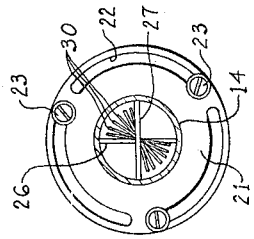
Fig. 4
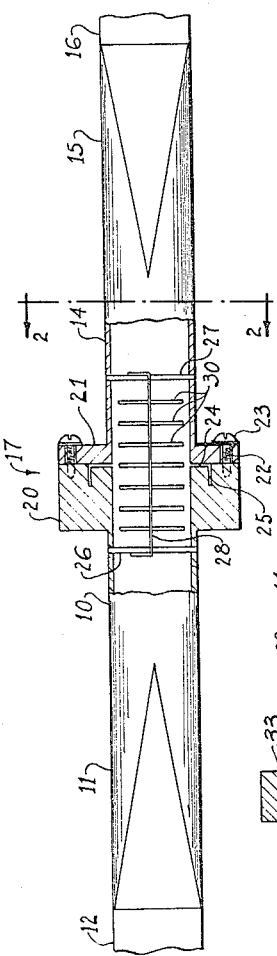
Fig. 1
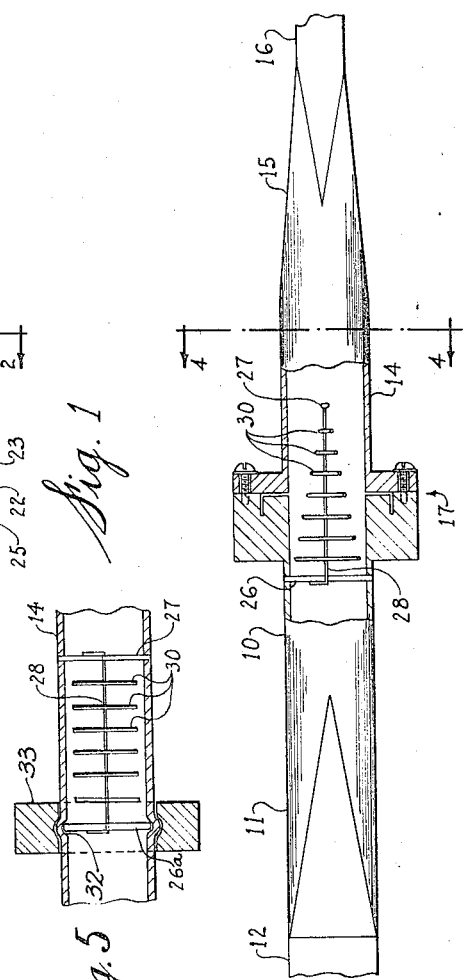
Fig. 3
Fig. 5
INVENTOR
William J. Bleackley
BY
James A. Lamb
PATENT AGENT

United States Patent Office 3,296,558
Patented Jan. 3, 1967

3,296,558
POLARIZATION CONVERTER COMPRISING METAL RODS MOUNTED ON A TORSION WIRE THAT TWISTS WHEN ROTATED
William J. Bleackley, Ottawa, Ontario, Canada, assignor to Canadian Patents and Development Limited, Ottawa, Ontario, Canada, a company of Canada
Filed Sept. 22, 1965, Ser. No. 489,121
6 Claims. (Cl. 333—21)

This invention relates to apparatus for rotating the plane of polarization of an electromagnetic wave, and in particular it relates to waveguide apparatus for rotating the plane of polarization of a microwave being transmitted therethrough.

When conducting or transmitting microwave energy from one point to another by a waveguide, it is sometimes desirable to rotate the plane of polarization of the wave. One known apparatus for doing this is a waveguide of circular cross-section which includes a rod mounted axially within the waveguide and solidly supported by a dielectric wafer or other support which engages the waveguide walls. The rod has a plurality of metal pins evenly spaced along its length extending diametrically of the waveguide and terminating short of the waveguide walls, or alternatively the pins may be terminated by the waveguide walls and soldered or otherwise joined to the walls. The pins are monted at different angular positions which progress angularly from one end of the rod to the other. If a wave reaches the first pin in the rod with its electric vector normal to the pin, the electric vector will be rotated with the pins as the wave moves through the guide. That is, the electric field vector will remain transverse or normal to the pins if the angular difference from one pin to the next is not too great. The plane of polarization may thus be rotated by a desired amount.

The previously discussed waveguide section provides a fixed amount of rotation of the plane of polarization. However, it is sometimes desirable to be able to change the amount of rotation. That is, it is sometimes desirable to be able to select a desired amount of rotation of the plane of polarization without replacing the waveguide section used for causing rotation. Apparatus for permitting selective rotation has been developed.

As one example, one well known means for doing this is described in "Principles and Applications of Waveguide Transmission" by George C. Southworth, published by D. Van Nostrand Company, Inc., about pages 328 to 331 where two special circular waveguide sections are used. Each waveguide section has a pair of diametral rods spaced apart along the waveguide by a distance of ⅜ wavelength of the wave being propagated. Each waveguide section has the property of introducing a 90 degree phase difference between any two perpendicular wave components and hence is termed a Δ90 degree section. The 90 degree phase differential introduced when a linearly polarized wave is applied, has the effect of forming a circularly polarized wave. Conversely, when the circularly polarized wave is applied to a second suitably oriented Δ90 degree section, the linear polarization is restored. Thus, two Δ90 degree sections in series with one another may be used for changing the plane of polarization by the orientation of the second section. This apparatus is, of course, frequency sensitive and the spacing of the diametral rods must be selected for a particular frequency.

As another example, a know prior art apparatus for selectively changing the amount by which the plane of polarization is rotated comprises a circular waveguide section having two axially aligned portions which are rotatable, one with respect to the other, about their common axis. Each portion has a pin element mounted diametrically across the waveguide spaced from the junction of the two portions, and a septum of flexible material extending between the pins. The septum is a thin flat strip whose edges terminate short of the waveguide walls. When the two pin elements are in alignment, the strip is in a flat untwisted configuration and a wave having its electric field or electric field vector normal to the plane of the septum will pass through the waveguide with no rotation. If one of the waveguide portions is rotated to a position where its pin element is not aligned with the pin element of the other portion, the septum will assume a twist which is distributed along its length. A wave approaching the septum with its electric field at right angles to the near end of the septum will have its plane of polarization rotated by the twisted septum as it passes along the waveguide. By adjusting the amount of rotation of one of the waveguide portions, the septum twist will be adjusted and the rotation of the plane of polarization of a wave through the waveguide section may be varied as desired.

In the apparatus just described, the septum should preferably be of a good conducting material for efficient operation, and it must be flexible to permit the twisting. The septum should be taut whether or not it is twisted or untwisted and consequently a degree of elasticity in the septum assembly is desirable. In addition, the septum should be of a material which is capable of considerable recycling (i.e. is capable of withstanding repeated twisting and untwisting). It may be different to provide a septum which will possess the desired qualities.

It is an object of the present invention to provide a waveguide apparatus of novel design for selectively rotating the plane of polarization of a wave propagating therein.

It is another object of this invention to provide a novel, rugged apparatus, capable of repeated recycling, for rotating the plane of polarization of a non-symmetrical propagated wave by a desired amount.

Further objects and advantages of this invention will appear in the following detailed description taken in conjunction with the accompanying drawings, in which:

FIGURE 1 is a side view, partly in section, of waveguide apparatus according to the invention, FIGURE 2 is a view taken along line 2—2 of FIGURE 1.

FIGURE 3 is a side view, partly in section, of the waveguide apparatus of FIGURE 1 in another operating position, FIGURE 4 is a view taken along line 4—4 of FIGURE 3, and FIGURE 5 is a sectional view of a variation of the invention.

Referring now to the drawings, and particularly to FIGURES 1 and 2, a hollow cylindrical waveguide portion or section 10 is shown connected by a transition portion 11 to a rectangular waveguide portion 12. Similarly, a hollow cylindrical waveguide portion or section 14 is shown connected by a transition portion 15 to a rectangular waveguide portion 16.

It should be noted here that the invention is concerned with the plane of polarization of a wave as it propagates through a circular waveguide in the $TE_{1,1}$ mode, that is as it propagates through waveguide sections 10 and 14. The apparatus may be used in a circular waveguide system, or it may be used with a rectangular waveguide system where transitional waveguide portions join the circular waveguide portions to rectangular waveguide portions as shown in the drawings.

A rotatable joint, indicated generally as 17, connects circular waveguide sections 10 and 14. Such joints are known in the art and may comprise two abutting flanges 20 and 21 respectively fixed to and surrounding the adjacent ends of circular waveguide sections 10 and 14 as shown in FIGURE 1. The waveguide section 10 with the flange 20 may be fixed, and the waveguide section 14 with any connected sections and with flange 21 may be rotatable. Three screws 23 in flange 20 pass through three arcuate slots 22 in flange 21 to hold the flanges in alignment while permitting limited rotational movement. A choke is machined into the flanges to prevent the leakage of wave energy between the flanges. The choke may comprise a slot 24 extending radially for a distance equal to one quarter the wavelength of the wave propagating in the waveguide, and a slot 25 extending into flange 20 from the end of slot 24 a distance substantially equal to one quarter wavelength (i.e. $\lambda/4$) the propagating wave. The choke, in effect, provides a short circuit at the junction of slot 24 and the waveguide wall as is well known.

Within the waveguide section 10, spaced from the junction of waveguide sections 10 and 14, is a mounting rod 26 which extends diametrically across section 10. Rod 26 may be of a metallic or a dielectric material. If rod 26 is a metal rod it has little effect on propagation when oriented transverse to the electric vector of the propagating wave. Mounting rod 26 is secured to the waveguide walls at its ends. Similarly, within waveguide section 14, spaced from the junction of sections 10 and 14, is a mounting rod 27 of metal or dielectric material which extends diametrically across section 14 and which is secured to the waveguide walls at its ends. The mounting rod 27 is positioned within section 14 so that rods 27 and 26 define a plane (i.e. rods 27 and 26 are aligned in a plane) when waveguide section 14 is rotated in one direction to a limit permitted by the slots 22 and screws 23. This is the position shown in FIGURES 1 and 2.

A torsion wire 28 is secured at one end to mounting rod 26 and at the other end to mounting rod 27 so that it extends axially within waveguide sections 10 and 14 between rods 26 and 27. The torsion wire may, for example, be of a type referred to generally as music wire and preferably silver plated steel wire or a berylium-copper music wire. Any spring-type wire capable of withstanding repeated torsional stresses would be satisfactory.

A plurality of metal rods 30 are fastened at their centers to torsion wire 28, spaced along wire 28 as shown. The spacing between adjacent metal rods is preferably just less than one quarter wavelength (i.e. just less than $\lambda/4$) of the wave being propagated. The spacing is not critical. It may be desirable to adjust the spacing slightly for a particular set of parameters. For example, if it is found that undesirable resonances occur, they may be eliminated by changing the spacing slightly.

The length of the metal rods 30 is preferably about 7/8 of the diameter of the waveguide. The length is not particularly critical. However, it should not be so great as to permit the ends to engage the waveguide walls and prevent free movement of the metal rods. The length of the rods 30 should, on the other hand, not be excessively short as the efficiency of the device decreases as the rod length is reduced. Satisfactory operation has been achieved with metal rods having a length of the order of half the waveguide diameter.

The metal rods 30 are positioned so that they lie in a plane when the waveguide section 14 is rotated in one direction to a limit as shown in FIGURES 1 and 2. Thus, the mounting rods 26 and 27 and metal rods 30 all lie in a plane.

Referring now to FIGURES 3 and 4, the same apparatus is shown as in FIGURES 1 and 2, but in FIGURES 3 and 4 the waveguide section 14 with connected waveguide portions 15 and 16 has been rotated through 90°. The mounting rod 27 is now in an axial plane at right angles to an axial plane through mounting rod 26. The torsion wire 28 is twisted and the metal rods 30 have an angular displacement between adjacent ones thereof which progresses evenly from one end to the other.

When in use the circular waveguide sections 10 and 14 are connected into a waveguide system so that a metal rod 30 at one end of the series of metal rods is positioned to be transverse to the electric field of the wave energy. This rod will have substantially no effect on the field of the wave energy. If the metal rods 30 are all in a plane (as in FIGURES 1 and 2) the wave energy will pass through with its electric field in the same orientation. However, if there is an angular displacement between adjacent metal rods 30, the electric field will tend to rotate to maintain an orientation normal to each metal rod 30. The torsion rod ensures that, as the movable waveguide is turned, the non-contacting posts take up intermediate angular positions. The angle $\theta_x$ through which a post, a distance $x$ from the first fixed post, will turn is given by $\theta_x = x/l\theta$ where $l$ is the distance between the posts and $\theta$ is the angle through which the movable waveguide has been turned. The reactance introduced by any post is a function of $\theta_x$. The electric vector, E, in the waveguide may be considered to be made up of two components, $E \cos \phi$ and $E \sin \phi$, where $\phi$ is the angle between the post and the normal to incident E. At each of the successive posts a large portion of the $E \sin \phi$ component is reflected and the $E \cos \phi$ component is passed on to the next post. However, since the angle that each post makes with the perpendicular E is always small, the $E \sin \theta$ component is always small, and the spacing of the posts is such that cancellation of the reflected components occurs and hence, the total reflection is small. Thus, as the wave progresses along the waveguide its plane of polarization is rotated. By adjusting the relative positions of waveguide sections 10 and 14, and consequently the twist in torsion wire 28, any desired amount of rotation of the wave field may be achieved. It is, of course, possible to make the apparatus so that more than 90° of rotation can be achieved.

It will be apparent that the apparatus will not function to rotate a wave propagating in a radial mode. The wave must be in a mode that is non-symmetrical with respect to the axis, that is a non-radial mode such as $TE_{1,1}$. In fact, it is a secondary advantage of the apparatus that it tends to suppress the undesirable second mode or radial $TM_{0,1}$ mode.

Referring now to FIGURE 5, there is shown a sectional view of a variation of the invention which has no rotatable joint. In some circumstances it may be desirable to effect a rotation of the plane of polarization of a wave being propagated in a circular waveguide without using a rotatable joint. A circular waveguide 14 is shown in FIGURE 5 having the mounting rod 27 fixed to the waveguide walls as before. Spaced along waveguide 14 is a smooth circumferential depression 32 which forms a bearing surface for mounting rod 26a. Mounting rod 26a may be of soft iron preferably plated with a metal having good conductivity to reduce losses in the waveguide, or it may be a magnet (also preferably plated with a good conducting metallic material). Mounting rod 26a has ends formed to fit within depression 32 and slidably engage the surface of the depression. A magnet 33 is mounted outside the waveguide 14 at the depression 32, as shown. Magnet 33 is magnetized so that it has poles adjacent to or in engagement with the walls of waveguide 14 and is so arranged that its magnetic field will move rod 26a into a predetermined position in the field. Magnet 33 may be moved rotatably about waveguide 14, i.e. may be moved about the axis of waveguide 14, to cause a corresponding movement of rod 26a. This provides the necessary twisting of torsion wire 28 and the movement of metal rods 30 as in the previously described apparatus.

It will be apparent that the apparatus in any of its forms is not frequency sensitive and has a bandwidth comparable to a circular hollow waveguide which contains no polarization rotating means.

It is believed that an improved apparatus of novel design for selectively rotating the plane of polarization of a wave has been described.

I claim:
1. Waveguide apparatus for rotating the plane of polarization of wave propagating therein in the $TE_{1,1}$ mode, comprising
 a hollow circular waveguide,
 a first mounting member within said waveguide fixed to the waveguide walls,
 a second mounting member within said waveguide spaced along said waveguide from said first mounting member and mounted to said waveguide to permit rotatable movement about the axis of the waveguide with respect to the position of the first mounting member,
 a torsion wire extending axially within said waveguide having a first end secured to said first mounting member and a second end secured to said second mounting member,
  said torsion wire twisting with rotation of said second mounting member with respect to said first mounting member, and
 a plurality of metal rods fastened centrally to said torsion wire at spaced intervals therealong and having ends spaced from the walls of said waveguide,
  said metal rods lying in a plane in a predetermined position of said second mounting member with respect to said first mounting member and having relative angular displacement between adjacent ones of said rods as said second mounting member is rotated from said predetermined position.

2. Waveguide apparatus for rotating the plane of polarization of waves propagating therein in the $TE_{1,1}$ mode, comprising
 a first hollow circular waveguide section,
 a second hollow circular waveguide section in axial alignment with said first section,
 a rotatable joint connecting said first and second sections permitting relative rotational movement of the first section with respect to the second section between a first position and a second position having an angular displacement from said first position,
 a torsion wire extending axially within said waveguide sections and having a first end terminating within said first section at a point spaced from said rotatable joint and a second end terminating in said second section at a point spaced from said rotatable joint,
 a first mounting member fixed to the waveguide walls of said first section and connected to said first end of said torsion wire for supporting said first end,
 a second mounting member fixed to the waveguide walls of said second section and connected to said second end of said torsion wire for supporting said second end, and
 a plurality of metal rods fastened centrally to said torsion wire at spaced intervals therealong and having ends spaced from the waveguide walls,
  said metal rods lying in a plane when said waveguide sections are in said first position and having relative angular displacement between adjacent ones of said rods when said waveguide sections are in said second position.

3. Waveguide apparatus for rotating the plane of polarization of waves propagating therein in the $TE_{1,1}$ mode and having a wavelength $\lambda$, comprising
 a first hollow circular waveguide section having a predetermined diameter,
 a second hollow cylindircal waveguide section having said predetermined diameter positioned in axial alignment with said first section,
 a rotatable joint connecting said first and second sections permitting rotation of said first section with respect to said second section between a first position and a second position having an angular displacement from said first position of about a right angle,
 a music wire extending axially within said waveguide sections and having a first end terminating within said first section at a point spaced from said rotatable joint and a second end terminating within said second section at a point spaced from said rotatable joint,
 a first mounting rod extending across said first section fixed to the waveguide walls thereof and connected to the first end of said music wire for supporting said first end,
 a second mounting rod extending across said second section fixed to the waveguide walls thereof and connected to the second end of said music wire for supporting said second end,
 a plurality of metal rods fastened at their centers to said music wire and spaced apart along said music wire a distance no greater than $\lambda/4$,
  the length of said metal rods being about ⅞ the diameter of the waveguide
  said metal rods and said mounting rods lying in a plane when said waveguide sections are in said first position and having relative angular displacement between adjacent rods when said waveguide sections are in said second position.

4. Waveguide apparatus as defined in claim 3 in which said music wire is a berylium-copper wire.

5. Waveguide apparatus as defined in claim 3 in which the angular displacement of waveguide sections between the first and second positions is substantially ninety degrees.

6. Waveguide apparatus for rotating the plane of polarization of a non-radial mode of wave propagating therein, comprising
 a hollow circular waveguide having a circumferential depression extending over at least two diametrically opposite portions of the inner wall of said waveguide,
 a mounting member within said waveguide fixed to the walls of said waveguide spaced axially along said waveguide from said circumferential depression,
 a mounting bar of magnetic material extending diametrically across said waveguide and having ends slidably engaging opposing portions of said circumferential depression for slidable rotational movement about the axis of the waveguide,
 a torsion wire extending axially within said waveguide and being fixed at one end to said mounting member and at the other end to said mounting bar,
 a plurality of metal rods fastened centrally to said torsion wire at spaced intervals therealong and having terminating ends spaced from the waveguide walls,
  said metal rods lying in a plane in a first predetermined position of said mounting rod and having a relative angular displacement between adjacent ones of said rods in a second position of said mounting rod angularly displaced from said first position, and
 a magnet mounted to said waveguide externally thereof adjacent said circumferential depression and having poles on opposite sides of said waveguide for exerting a magnetic positioning influence on said mounting bar.

References Cited by the Examiner
UNITED STATES PATENTS 2,890,426  6/1959  McElwain ————— 333—21 X
3,024,463  3/1962  Moeller et al. ————— 333—21 X HERMAN KARL SAALBACH, *Primary Examiner.*

P. GENSLER, *Assistant Examiner.*